United States Patent
Fukuoka et al.

(10) Patent No.: US 10,668,620 B2
(45) Date of Patent: Jun. 2, 2020

(54) METHOD AND APPARATUS FOR CORRECTING MOTIONS OF ROBOT

(71) Applicant: DENSO WAVE INCORPORATED, Chita-gun, Aichi-pref. (JP)

(72) Inventors: Takafumi Fukuoka, Chita-gun (JP); Yuto Kawachi, Chita-gun (JP); Hiroaki Shiratori, Chita-gun (JP); Daisuke Kawase, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 347 days.

(21) Appl. No.: 15/845,452

(22) Filed: Dec. 18, 2017

(65) Prior Publication Data
US 2018/0169860 A1 Jun. 21, 2018

(30) Foreign Application Priority Data
Dec. 19, 2016 (JP) ................................ 2016-245489

(51) Int. Cl.
*B25J 9/16* (2006.01)
*B25J 15/00* (2006.01)

(52) U.S. Cl.
CPC ......... *B25J 9/1641* (2013.01); *B25J 15/0019* (2013.01); *G05B 2219/39186* (2013.01); *Y10S 901/02* (2013.01); *Y10S 901/41* (2013.01)

(58) Field of Classification Search
CPC ............................... B25J 9/16; B25J 15/0019
See application file for complete search history.

(56) References Cited

U.S. PATENT DOCUMENTS

| 5,418,441 | A | 5/1995 | Furukawa | |
|---|---|---|---|---|
| 2007/0214919 | A1* | 9/2007 | Ehleiter | B23P 19/06 81/451 |
| 2010/0178124 | A1* | 7/2010 | Dickerson | B25J 9/1638 409/141 |
| 2016/0288325 | A1* | 10/2016 | Naderer | B25J 9/1633 |
| 2017/0190049 | A1* | 7/2017 | Wada | B23K 9/12 |

\* cited by examiner

*Primary Examiner* — Kira Nguyen
(74) *Attorney, Agent, or Firm* — Oliff PLC

(57) ABSTRACT

In an industrial robot, correction is made for change in position and attitude of an arm distal end due to mechanical deflection of the robot. In the robot, a moment applied to the first axis in its non-rotation direction opposite to its rotation direction is calculated from a load torque applied to the second axis in its rotation direction, a moment due to a second-axis-side self-weight, and a ratio of a distance between the rotation centers of the first and second axes, to a distance between the rotation centers of the second axis and a tool. A deflection amount indicating an angle of the first axis tilting in the non-rotation direction is calculated from the moment applied to the first axis and the rigidity of the first axis in the non-rotation direction. A control value is corrected based on the deflection amount to control the robot.

12 Claims, 7 Drawing Sheets

METHOD AND APPARATUS FOR CORRECTING MOTIONS OF ROBOT

CROSS-REFERENCE TO RELATED APPLICATION

This application is based on and claims the benefit of priority from earlier Japanese Patent Application No. 2016-245489 filed Dec. 19, 2016, the descriptions of which are incorporated herein by reference.

BACKGROUND

[Technical Field]

The present disclosure relates to a method and apparatus for correcting motions of a robot, and in particular, to a method and apparatus for correcting changes in motions of industrial robots due to mechanical deflection developed in the robot.

[Related Art]

Industrial robots nowadays are indispensable production means in factories and other facilities. These industrial robots (simply termed robot(s) hereinafter) are generally used, with a tool suitable for the usage being attached to the end effector. Such a robot may make a motion applying a force in a direction perpendicular to its installation surface, such as when assembling a workpiece held by the tool to a predetermined position of an object, or when screwing a screw to a workpiece if the tool is a screwdriver or the like.

When making such a motion, the force to be generated by the robot is usually acquired by a sensor or the like, and controlled in terms of impedance, for example, so that the acquired force will be a specified pressing force. To prevent scratches on the surface of the workpiece or to prevent damage to the workpiece when applying the force, the tip end of the tool is required to be aligned over the object with high accuracy, and the load torque is required to be estimated with high accuracy.

However, the fact is that accurate alignment made under control may be lost due to mechanical deflection of the robot which is caused by its own weight or the like. In the occurrence of mechanical deflection, the tip end position of the tool may be misaligned from the target position, disabling assemblage of the workpiece, or the load torque may be erroneously estimated, leading to application of an excessively large force. As measures against such mechanical deflection, a patent document JP H04-233602 A proposes detecting the mechanical deflection caused in a robot and correcting the end effector position of the robot.

CITATION LIST

Patent Literature

[PTL 1] JP H04-233602 A

SUMMARY OF INVENTION

Technical Problem to be Solved

The proposal offered by the patent document JP H04-233602 A is to calculate a joint torque imposed on each axis (W axis, U axis), for use in the calculation of a deflection angle of the axis, and correct the end effector position based on the calculated deflection angle of the axis. In the case of the robot described in this patent document, if the calculated joint torque is more or less different from the actual torque, the end effector position cannot be properly corrected. The mechanical deflection during assemblage of a workpiece may be caused not only by the self-weight of the robot, but also by an external force applied during the assemblage. The process described in this patent document cannot be applied to the correction of mechanical deflection if it has been caused by an external force.

In this regard, a force sensor or the like may be attached to the tip end to detect the external force applied thereto for calculation of the deflection. However, this configuration entails use of an additional component, such as a sensor, having high accuracy, and may increase cost. Otherwise, each axis may be ensured to have high rigidity so as not to develop deflection. Achieving high rigidity in each axis may increase size and weight of the arm. Accordingly, it is difficult to balance high rigidity with other needs such as of downsizing, speed increase, or weight saving of robots.

SUMMARY

In view of the circumstances set forth above, it is desired to provide a method of correcting deflection of a robot, and in particular to provide a method of correcting change in motion of an industrial robot due to mechanical deflection developed in the robot, and to provide a control apparatus for the robot.

According to a typical example, a moment applied to the first axis in a non-rotation direction that is opposite to a rotation direction of the first axis is calculated based on a load torque applied to the second axis in a rotation direction, a moment due to a second-axis-side self-weight, and a ratio of a distance between rotation centers of the first axis and the second axis, relative to a distance between rotation centers of the second axis and a tool. Subsequently, a deflection amount indicated by an angle of the first axis tilting in the non-rotation direction is calculated based on the moment applied to the first axis in the non-rotation direction, and a rigidity of the first axis in the non-rotation direction.

Thus, the mechanical deflection amount of the first axis can be calculated without the need of providing an additional component, such as a force sensor. Then, based on the deflection amount, a control value is corrected for the control of the robot, which eliminates the need of enhancing rigidity of the arm. Accordingly, change in robot motion due to deflection caused in the joint axis of the robot can be corrected without curbing reduction in size or weight or speed increase of the robot.

In another example, the load torque applied to the second axis in the rotation direction is calculated from a difference between angles detected on an input-shaft side and an output-shaft side of the second axis, and a rigidity of a decelerator 24 provided to the second axis. Thus, a load torque applied to the second axis in the non-rotation direction, i.e., a parameter required for calculating a deflection amount, can be calculated without the need of additionally providing a component.

In still another example, an angle detected on an output-shaft side of the first axis is corrected based on the deflection amount. Thus, the actual rotation angle of the first axis can be properly acquired in the occurrence of an error in the detected angles due to deflection of the first axis. Accordingly, the rotation angle of the first axis can be correctly controlled and, for example, the distal end position of the tool can be determined with high accuracy.

Preferably, an estimated load torque to be applied to the first axis may be corrected based on the deflection amount. Thus, the actual load torque can be estimated with high accuracy in the occurrence of an error in the estimation of the load torque due to deflection of the first axis. This way of correction can prevent the workpiece from being damaged due to the robot applying an excessive force thereto as a result of erroneously determining the load torque as being excessively small, or from being erroneously assembled due to the robot being unable to generate a necessary force as a result of erroneously determining the load torque as being excessively large.

Preferably, a distal end position of a tool may be corrected based on the deflection amount. Thus, in the occurrence of misalignment of the distal end position of the tool due to deflection of the first axis, the misalignment can be corrected. Accordingly, the distal end position of the tool can be determined with high accuracy, which leads to preventing assemblage at an erroneous position, or reducing possible scratches on the surface of the workpiece or possible damage to the workpiece.

According to still another typical example, a correction apparatus for a robot may include a moment acquisition section acquiring a moment applied to a first axis in a non-rotation direction, a deflection amount acquisition section acquiring a deflection amount of the first axis, and a correction section correcting a control value based on the deflection amount. Thus, as described above, since there is no need of additionally providing a component, such as a force sensor, to the robot, or enhancing rigidity of the arm, deflection occurring in the robot can be corrected without curbing reduction of size or weight or speed increase of the robot. Accordingly, the distal end position of the tool can be determined with high accuracy, and the force applied to the distal end of the tool can be detected with high accuracy. Consequently, the robot is able to conduct work of great difficulty that needs high assembling accuracy.

DETAILED DESCRIPTION OF THE PREFERRED EMBODIMENTS

With reference to the drawings, various embodiments will be described.

Referring first to FIGS. 1 to 8, a description will be given of a method and an apparatus for correcting mechanical deflection caused in a robot, according to an embodiment. As will be described later, these method and apparatus are embodied by a controller that controls a robot.

Figure 1:
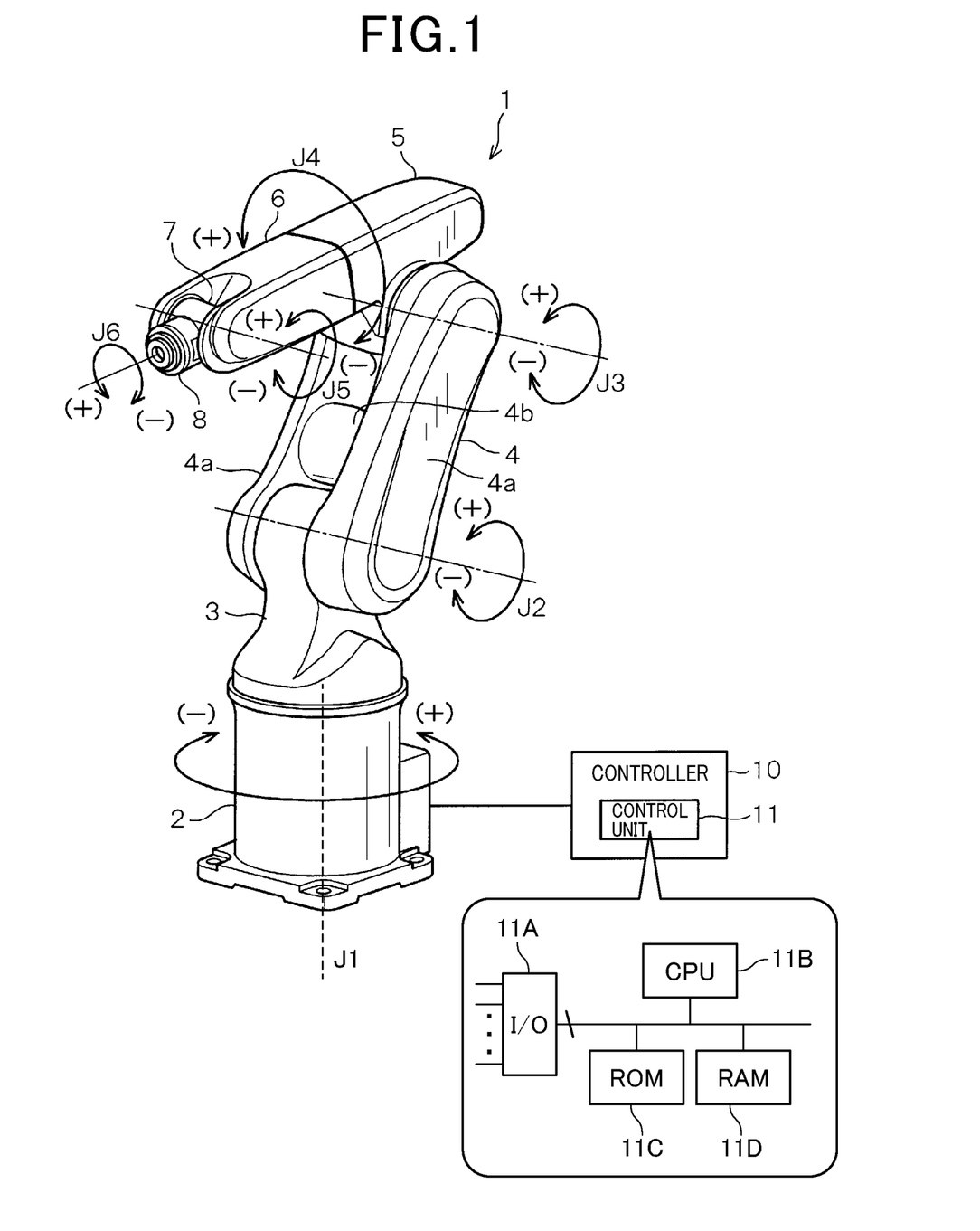
FIG. 1 is a schematic perspective view illustrating an overall configuration of a robot, according to an embodiment of the present disclosure.

FIG. 1 is a schematic perspective view illustrating an overall configuration of a robot 1, according to an embodiment of the present disclosure. As shown in FIG. 1, the robot 1 having a known configuration as a vertical articulated robot is connected to a controller 10. The controller 10 serves as a correction apparatus having a correction function unique to the present disclosure.

The controller 10 is provided with a control unit 11 that includes a microcomputer, not shown. The control unit 11 includes, as an example, an input/output interface 11A, a CPU (central processing unit) 11B, a ROM (read only memory) 11C storing programs, specific data, and the like in advance, and a RAM (random access memory) 11D used for temporarily reading/writing data, as well as other elements, not shown, used for achieving computer functions.

The ROM 11C stores data of various programs, including a program for robot control, and a program for position/attitude correction (deflection correction) of an end effector of an arm due to deflection developed in the arm. The CPU 11B, when started, reads the programs and sequentially executes them. Accordingly, the activation state of the robot 1 is controlled and, at the same time, a correction described later is executed with software. Thus, the ROM 11C serves as a non-transient computer-readable recording medium.

The ROM 11C may be a mask ROM, a PROM (programmable ROM), or other types of memory devices.

With the programs being executed with software, the controller 10 serves as the moment acquisition section, the deflection amount acquisition section, and the correction section, which will be specifically described later. The moment acquisition section, the deflection amount acquisition section, and the correction section are realized on a software basis in the present embodiment by the programs executed by the control unit 11 (i.e., the CPU 11B) of the controller 10.

The robot 1 has a shoulder 3 provided on a base 2. The shoulder 3 is horizontally rotatably connected to the base 2 through a first axis (J1) having a Z-direction shaft center. The shoulder 3 has a distal end portion to which a lower arm 4, extending upward, is rotatably connected through a second axis (J2) that is a rotation axis perpendicular to the first axis. The lower arm 4 has a distal end portion to which a first upper arm 5 is rotatably connected through a third axis (J3) that is a rotation axis parallel to the second axis. The first upper arm 5 has a distal end portion to which a second upper arm 6 is twistably and rotatably connected through a fourth axis (J4) that is a rotation axis perpendicular to the third axis.

The second upper arm 6 has a bifurcated distal end portion to which a wrist 7 is rotatably connected, being sandwiched between the two projections of the fork of the wrist, through a fifth axis (J5) that is a rotation axis perpendicular to the fourth axis. The wrist 7 is provided with a flange 8 which is twistably and rotatably connected to the wrist 7 through a sixth axis (J6) that is a rotation axis perpendicular to the fifth axis. The first to sixth axes correspond to the joint axes of the robot 1.

The flange 8 serving as an extreme tip portion of the arm of the robot 1 is attached with an hand, or a tool 9 (see FIG. 5) which is also referred to as an end effector or the like. The tool 9 may be, for example, a holder for holding a workpiece W (see FIG. 5), a screwdriver for screwing a screw into the workpiece W, or other tools.

The axes of the robot 1 are provided with respective motors serving as drive sources to rotate the arms. The motors are controlled by the controller 10 in terms of the rotation angles to change the attitude of the robot 1. Of the motors, a first motor 20 shown in FIG. 2 having the first axis as a rotation axis is provided on the inside of the base 2, being housed in a housing 21.

The first motor 20 includes an input-shaft-side encoder 22 detecting an input-shaft-side rotation angle, an output-shaft-side encoder 23 detecting an output-shaft-side rotation angle, and a decelerator 24 serving as a transmission mechanism. For the sake of simplification, FIG. 2 omits hatching indicative of a cross section.

Figure 2:
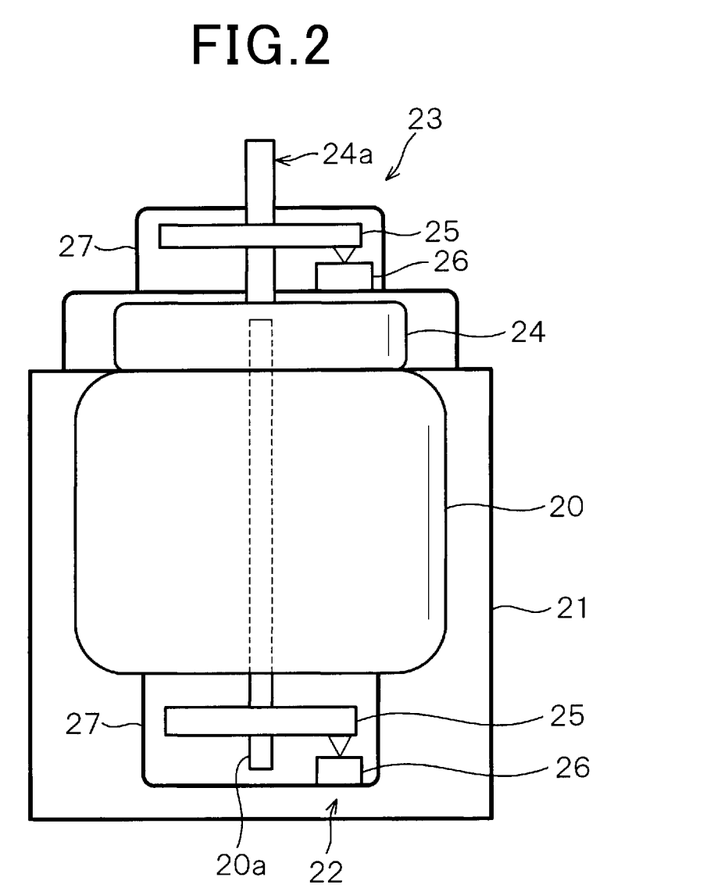
FIG. 2 is a schematic diagram illustrating a configuration of a motor.

The input-shaft-side encoder 22 is connected to an axis member of the first motor 20. The axis member is coaxial with the first axis and includes an encoder disc 25 and a detection element 26. The encoder disc 25 rotates in a plane perpendicular to the first axis. The detection element 26 applies light to the encoder disc 25 and receives the reflected light.

The encoder used in the present embodiment is a reflection type encoder in which a light source and a light-receiving element are incorporated into a single package. However, the encoder may be of a transmission type. The input-shaft-side encoder 20 is mounted to a rotary shaft 20a of the first motor 20.

As is known, the encoder disc 25 is provided with a plurality of slits and so configured that portions reflecting light and portions transmitting light will alternately face the detection element 26 as the encoder disc 25 rotates. The reflected light entering through the slits is detected by the detection element 26 to obtain a rotation angle of the encoder disc 25, that is, an input-shaft-side rotation angle at the first axis. The input-shaft-side encoder 22 may be of an increment type or of an absolute type.

The encoder disc 25 and the detection element 26 are covered with a covering 27. The covering 27 having a heat resistant structure contributes to enhancing heat resistance of the encoder. In other words, the input-shaft-side encoder 22 takes measures against heat or noise.

The detection element 26 is disposed at a position facing the encoder disc 25 on the inside of the covering 27. The position facing the encoder disc 25 herein refers to a position facing the slits of the encoder disc 25. Therefore, when the first motor 20 is activated and rotated, the encoder disc 25 rotates accordingly relative to the detection element 26, in a state of directly facing the detection element 26. Thus, the input-shaft-side rotation angle of the first motor 20 is detected.

The decelerator 24 reduces the rotation speed of the axis member of the first motor 20 and transfers the decelerated rotation to an output stage that is the output shaft. In the present embodiment, a wave motion gearing device is used as the decelerator 24. Any structure other than the decelerator 24 may be used as a transfer mechanism, as long as the structure can transfer the torque of the first motor 20. Accordingly, other mechanism than the wave motion gearing device may be used as the decelerator 24. The decelerator 24 has a rotary shaft 24a to which the lower arm 4 is rotatably connected.

The output-shaft-side encoder 23 is disposed on an output-shaft side of the decelerator 24. Similarly to the input-shaft-side encoder 22, the output-shaft-side encoder 23 includes an encoder disc 25 and a detection element 26 to detect the rotation angle of the output-shaft-side first axis. The encoder disc 25 rotates in a plane perpendicular to the first axis. The detection element 26 applies light to the encoder disc 25 and receives the reflected light. The output-shaft-side encoder 23 is mounted to the rotary shaft 24a of the decelerator 24.

The first axis is so configured as to detect rotation angles on both input- and output-shaft sides. The rotation angle detected by the input- or output-shaft-side encoder 22 or 23 may hereinafter be also referred to as detected angles, or just as angles. Thus, the rotation angles are highly accurately detected and determined using the input- and output-shaft-side detected angles.

Although not shown, the second axis includes a second motor that is provided with encoders on the respective input and output-shaft sides similarly to the first axis. That is, the second axis is also so configured as to detect angles on both the input and output-shaft sides.

The deflection amount in detected angles on the respective input and output-shaft sides of the second axis, that is, a deflection amount in the rotation direction, is termed twist angle hereinafter. It should be noted that the third to sixth axes may be so configured as to detect only the input-shaft-side rotation angle, or may be so configured as to detect rotation angles on both the input and output-shaft sides.

The following description addresses advantageous effects exerted by the configuration described above.

Figure 3:
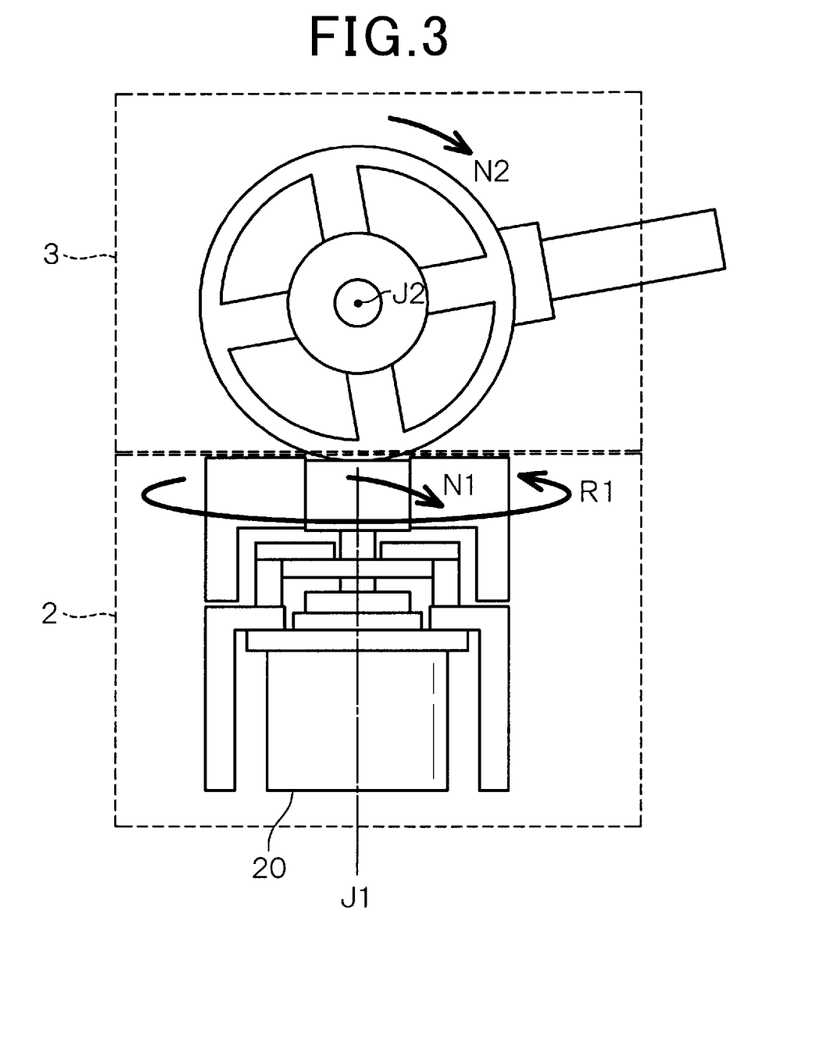
FIG. 3 is a schematic diagram illustrating moments applied to first and second axes.

As schematically shown in FIG. 3, the first axis extends nearly vertically to the installation surface of the robot 1 while the second axis extends in a direction perpendicular to the first axis. Thus, in the present embodiment, the base 2 corresponds to the first arm having the first axis, and the shoulder 3 corresponds to the second arm having the second axis.

The first axis is applied with an external force in a non-rotation direction that is different from the rotation direction (R1). The external force is attributed to the second-axis-side self-weight or the second-axis-side attitude change of the robot. In other words, the first axis is applied with moment in the non-rotation direction, due to which the first axis can tilt, resulting in the occurrence of mechanical deflection in the first axis. As shown in FIG. 3, the moment (N1) applied to the first axis in the deflection direction becomes equal to the moment (N2) applied to the second axis in the twist direction because the lower end of the second axis is fixed to the base 2.

Figure 4A:
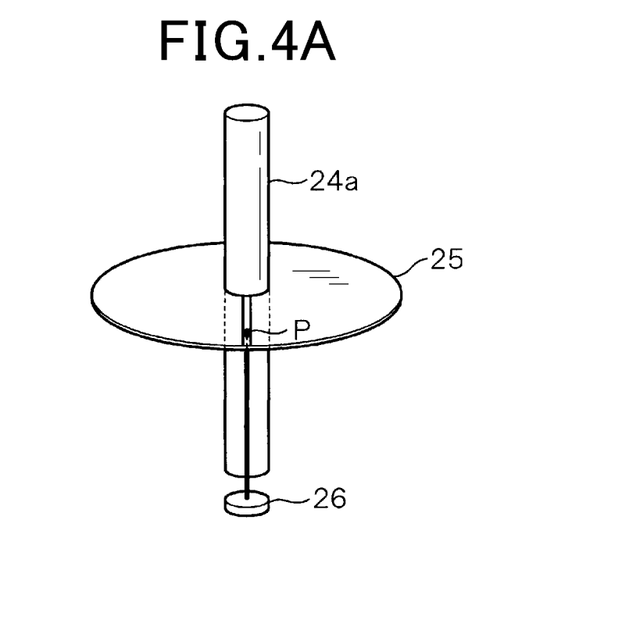
FIGS. 4A and 4B are schematic diagrams illustrating displacement in read position of an encoder due to deflection.

As mentioned above, the first axis is provided with the output-shaft-side encoder. As shown in FIG. 4A, the rotary shaft 24a of the decelerator 24 remains untilted in the output-shaft-side encoder 23 in the absence of mechanical deflection, so that the encoder disc 25 directly faces the detection element 26. In this state, the read position (P) is correctly positioned as schematically indicated by the double line.

Figure 4B:
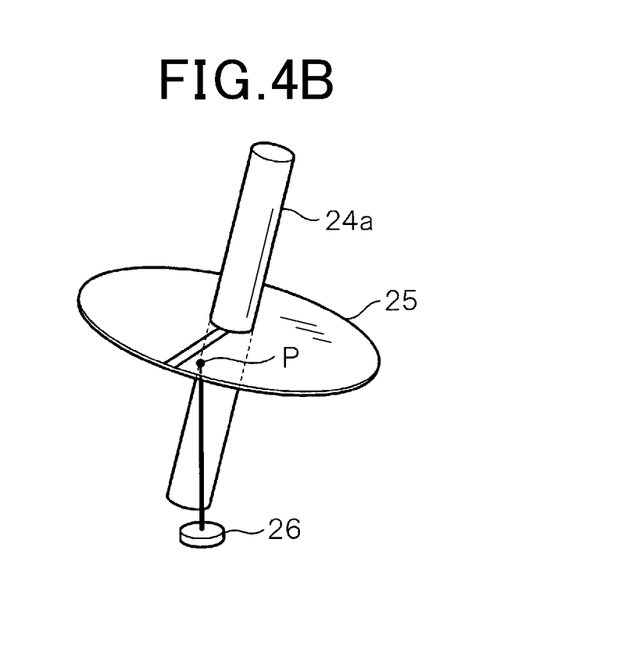

In the occurrence of mechanical deflection in the first axis, the rotary shaft 24a of the decelerator 24 tilts as shown in FIG. 4B, and the encoder disc 25 no longer directly faces the detection element 26. In this state, the read position (P) is offset from the correct location, causing error in detected angles. The error in detected angles may impair the accuracy in distal end position of the tool 9 or may lead to erroneous estimation of the load torque.

Since the first axis is a sort of root of the robot 1, the offset of the root may greatly offset the distal end position of the tool 9. For this reason, it is important to detect the deflection developed in the first axis and correct unwanted change in motion due to the deflection.

Figure 5:
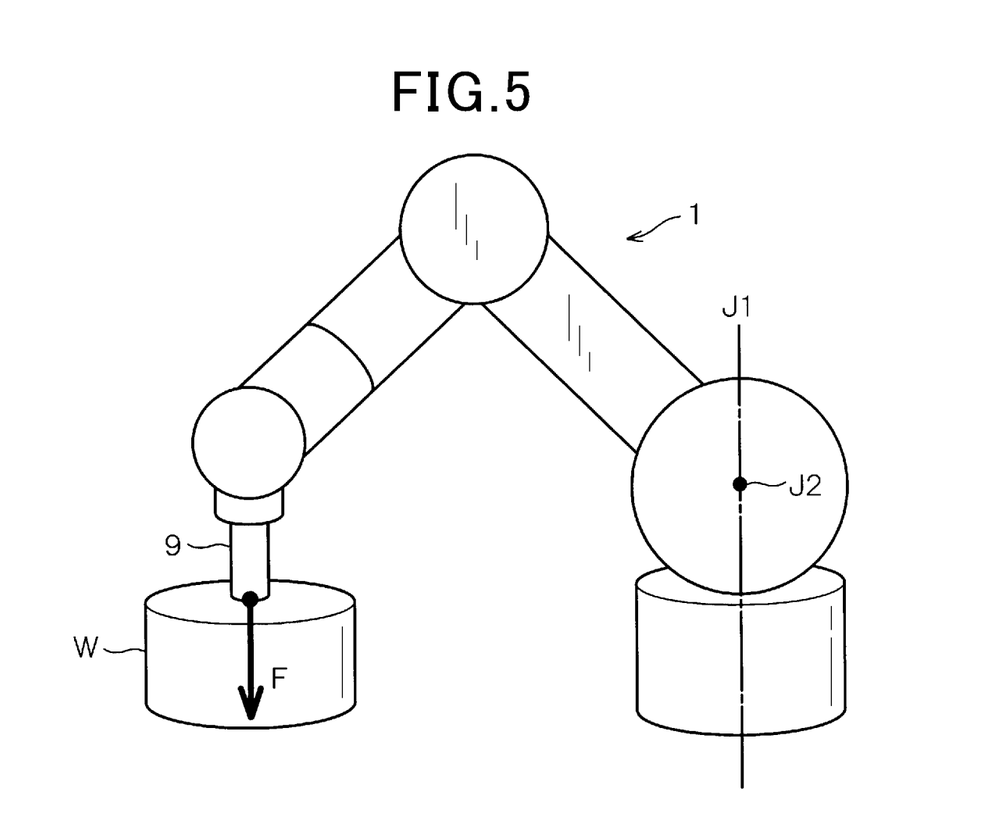
FIG. 5 is a schematic diagram illustrating an example of a working mode of a robot.

Specifically, as shown in FIG. 5, let us assume a motion, for example, of vertically pressing the tool 9 against the workpiece (W). The motion may alternatively be a motion of pressing the workpiece (W) held by the tool 9 in vertical direction. For the sake of simplification, FIG. 5, as well as FIG. 7 referred to later, schematically illustrates the robot 1 represented by the axes and the links connecting between the axes.

In the motion shown in FIG. 5, the robot 1 applies a force (F) vertically downward and then receives a reaction force (Fb) in the direction opposite to that of the applied force. Specifically, the robot 1 receives an external force in the vertical direction. The external force, i.e. the reaction force, is exerted to the first axis in the form of a moment in the non-rotation direction.

When receiving an external force in the vertical direction, the moment applied to the first axis in the non-rotation direction is equal to the sum of the load torque applied to the second axis in the rotation direction and the moment corresponding to the second-axis-side self-weight. This is because the lower end of the base 2 is fixed to the installation surface.

Therefore, if the load torque applied to the second axis in the rotation direction and the moment corresponding to the second-axis-side self-weight can be calculated, the moment applied to the first axis in the non-rotation direction can be calculated. Furthermore, if the moment applied to the first axis in the non-rotation direction can be calculated, the moment can be used as a basis for calculating the tilt angle, that is, the deflection amount of the first axis in the non-rotation direction.

Figure 6:
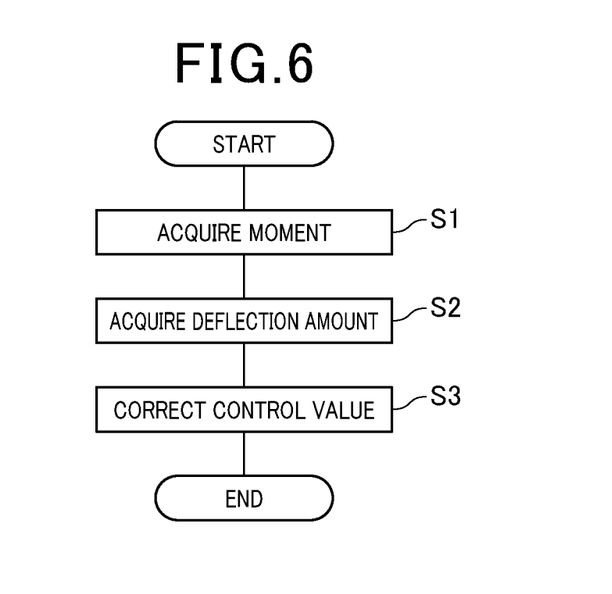
FIG. 6 is a flow diagram illustrating processing performed by a controller.

In this regard, the controller 10 executes the process shown in FIG. 6. In this process, the controller 10 acquires a moment applied to the first axis in the non-rotation direction (step S1), further acquires a deflection amount of the first axis (step S2), and corrects the control value, based on the deflection amount (step S3). Details of the steps of the process will be described below.

First, parameters are defined as follows.

$N_1$: Moment [Nm] applied to the first axis in the non-rotation direction $\varphi$: Deflection amount [deg] of the first axis (tilt of the first axis in the non-rotation direction)

$N_2$: Load torque [Nm] applied to the second axis in the rotation direction g: Gravitational acceleration [m/s²]

Figure 7:
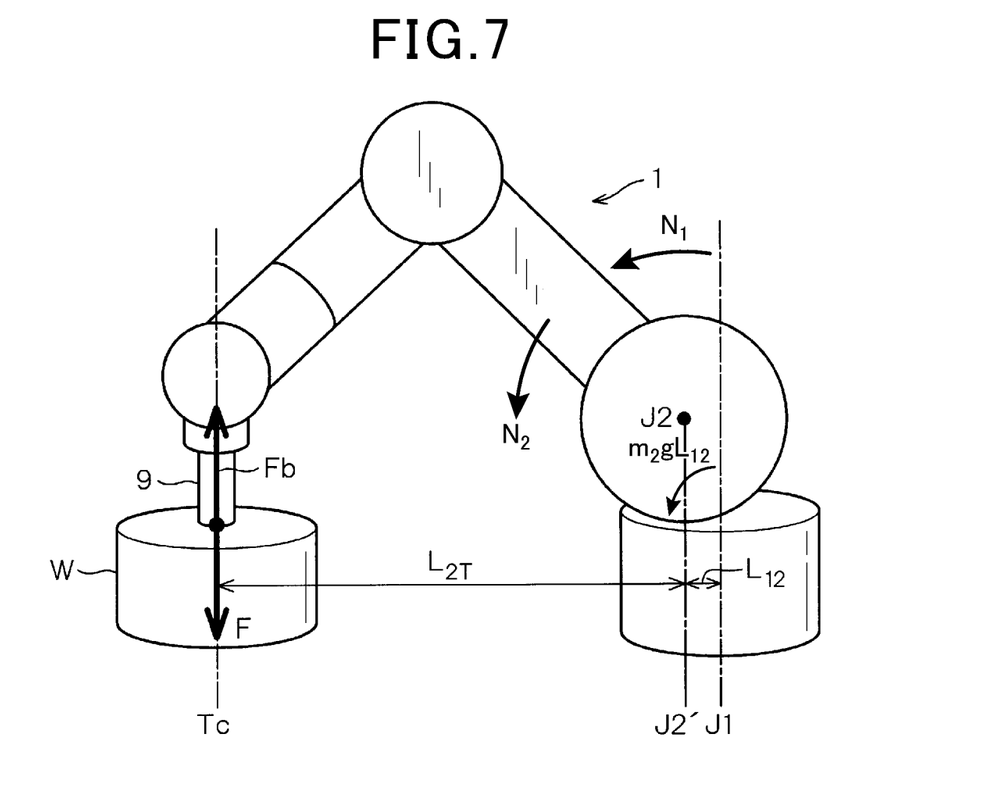
FIG. 7 is a schematic diagram illustrating a state where deflection has occurred.

$m_2$: Mass [kg] of a portion extending from the output-shaft side of the decelerator of the first axis to the input-shaft side of the decelerator of the second axis $L_{12}$: Distance [m] between the rotation centers of the first and second axes $L_{2T}$: Distance [m] between the rotation centers of the second axis and the tool $K_1$: Rigidity [Nm/deg] of the first axis in the non-rotation direction $K_2$: Rigidity [Nm/deg] of the second axis in the twisting direction $K_3$: Proportionality constant $\theta_1$: Detected input-shaft-side angle [deg] of the first axis Of these definitions, the distance between the rotation centers of the first and second axes, and the distance between the rotation centers of the second axis and the tool 9 are respectively defined, as shown in FIG. 7, to be the distance $L_{12}$ between the first axis (J1) and a projection position (J2') where the second axis is projected to the installation surface, and to be the distance $L_{2T}$ between the projection position (J2') and the rotation center (Tc) of the tool 9.

The distance between the rotation centers of the first and second axes can be calculated from the attitude of the robot because the distance between the first and second axes is already known as a designed value.

The distance between the rotation centers of the second axis and the tool 9 can be calculated using a control coordinate system in which the position passing through the first axis is commonly determined to be the origin. Specifically, for example, this distance is calculated from the origin coordinate and the coordinate of the distal end position of the tool 9 obtained from the control value.

When the robot 1 receives an external force in the vertical direction, the moment applied to the first axis in the non-rotation direction is calculated from: the load torque applied to the second axis in the rotation direction; the moment due to the second-axis-side self-weight; and the ratio of the distance between the rotation centers of the first and second axes, to the distance between the rotation centers of the second axis and the tool 9, as expressed by the following Formula (1).

$$N_1 = N_2\left(1 + \frac{L_{12}}{L_{2T}}\right) + m_2 g L_{12} \qquad (1)$$

The moment applied to the first axis in the non-rotation direction is acquired by the moment acquisition section which is realized on a software basis by the control unit 11 (i.e., CPU 11B) of the controller 10.

The deflection amount of the first axis is expressed by the following Formula (2). The rigidity of the first axis in the non-rotation direction can be obtained from the specification of the decelerator 24. Otherwise, the rigidity of the first axis in the non-rotation direction is published as the specification of the decelerator 24.

$$\varphi = \frac{N_1}{K_1} \qquad (2)$$

Based on these Formulas (1) and (2), the deflection amount $\varphi$ of the first axis can be calculated from the following Formula (3).

$$\varphi = \frac{N_2\left(1 + \frac{L_{12}}{L_{2T}}\right) + m_2 g L_{12}}{K_1} \qquad (3)$$

The deflection amount $\varphi$ of the first axis is acquired by the deflection amount acquisition section realized on a software basis by the control unit 11 of the controller 10.

As is well known, the load torque applied to the second axis in the rotation direction can be calculated from a current value. However, when the second axis is provided with the input- and output-shaft-side encoders 22 and 23 as in the present embodiment, the load torque in question can be calculated, as indicated in the following Formula (4), based on a twist angle $\theta$ that is the difference between the detected angles. The rigidity of the second axis in the twisting direction can be obtained from the specification of the decelerator 24. Otherwise, the rigidity of the second axis in the twisting direction is published as the specification of the decelerator 24.

$$N_2 = K_2 \theta \qquad (4)$$

A difference $\beta$ between the detected angles of the input- and output-shaft-side encoders 22 and 23 of the first axis can be calculated as in the following Formula (5). If a detected angle $\theta_1$ of the input-shaft-side encoder of the first axis and the moment applied to the first axis in the non-rotation direction are calculated, the difference between the detected angles of the first axis, i.e. an error in the detected angle of the output shaft can be calculated.

$$\beta = K_3 N_1 \cos \theta_1 \quad (5)$$

Formula (5) will be explained. If a moment is applied to the first axis in the non-rotation direction, the rotary shaft 24a of the decelerator 24 will tilt. In this regard, application of a moment of the same magnitude does not always result in the same read position with respect to the encoder disc 25, but may result in a different read position, depending on the tilt direction of the rotary shaft 24a. Specifically, in FIG. 4A, if a moment is applied leftward as viewed in the figure, the read position will be greatly shifted. However, if a moment is applied toward the near side as viewed in the figure, the read position of the encoder disc will not be shifted. This variation in read position sinusoidally occurs conforming to the input-shaft angle $\theta_1$ of the first axis.

Figure 8:
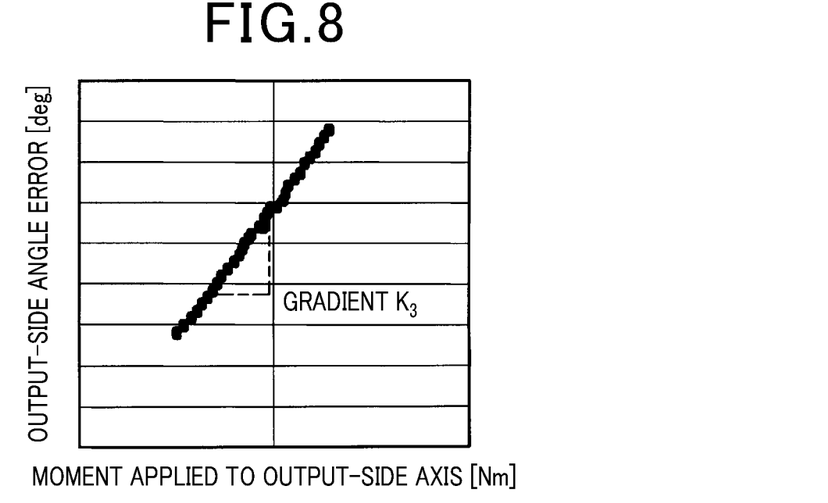
FIG. 8 is a diagram illustrating an example of a method of calculating a proportionality constant on a trial basis.

The proportionality constant (i.e., gradient) $K_3$ may be calculated from a designed value of the robot 1 or may be an actually measured value. Specifically, the input-shaft angle $\theta_1$ of the first axis may be one that maximizes the offset of the read position of the encoder disc 25. With such an angle, the moment applied to the output-shaft-side first axis may be permitted to vary as shown in FIG. 8 using test facilities, during which the output-shaft angle error caused in the output shaft may be measured to use the tilt as the proportionality constant.

In this way, the moment applied to the first axis in the non-rotation direction can be calculated based on the load torque applied to the second axis in the rotation direction, the moment applied to the second axis due to its own weight, and the ratio of the distance between the rotation centers of the first and second axes, to the distance between the rotation centers of the second axis and the tool 9. Once the moment applied to the first axis in the non-rotation direction is calculated, the deflection amount of the first axis can be calculated from the moment applied to the first axis in the non-rotation direction, and the rigidity of the first axis in the non-rotation direction.

The control value is then corrected based on these results to determine the position of the distal end of the tool 9 with high accuracy and estimate the load torque with high accuracy. The correction is made by the correction section that is realized on a software basis by the control unit 11 of the controller 10.

Specifically, Formula (5) set forth above can be used for calculating an error in the detected angles, based on the deflection amount, thus enabling correction of the output value, that is, correction of the detected angle of the output-shaft-side encoder 23. With this correction, the output-shaft-side rotation angle of the first axis can be properly acquired without an error, which leads to enhancing accuracy in positioning and reducing possible scratches on the surface of the workpiece (W) or possible damage to the workpiece (W).

Use of the deflection amount for correction of the detected angle of the output-shaft-side encoder 23 enables proper acquisition of the difference between the angles detected on the output and input-shaft sides of the first axis. In other words, the twist angle of the first axis can be properly acquired. Thus, based on the rigidity of the decelerator and the twist angle of the first axis, the load torque of the first axis can be acquired without error. In this way, a necessary load torque can be specified with high accuracy, which leads to reducing excessive pressing force or pressing force in an undesired direction, or reducing possible occurrence of insufficient pressing force.

The deflection amount can be used for directly correcting the distal end position of the tool 9. For example, if deflection occurs leftward as viewed in FIG. 7, the distal end position of the tool 9 can be moved rightward accordingly as viewed in FIG. 7 to determine the distal end position of the tool 9 with high accuracy. In other words, the error of the robot 1 can be corrected in terms of its distal end position and attitude (three-dimensional position and attitude).

According to the embodiment set forth above, the following advantageous effects can be obtained.

In the correction method according to the embodiment, the moment applied to the first axis in the non-rotation direction is calculated to calculate the deflection amount of the first axis, and the deflection amount is used for correcting the control value. Specifically, the moment applied to the first axis in the non-rotation direction is calculated based on the load torque applied to the second axis in the rotation direction, the moment due to the second-axis-side self-weight, and the ratio of the distance between the rotation centers of the first and second axes, to the distance between the rotation centers of the second axis and the tool 9. Then, the deflection amount of the first axis is calculated from the calculated moment applied to the first axis in the non-rotation direction and rigidity of the first axis in the non-rotation direction. Further, using the deflection amount as a basis, the control value is corrected for correction of the position of the end effector at the distal end of the arm. With the corrected control value, position and attitude (arm motion) of the distal end (e.g., the distal end of the end effector) of the robot arm is corrected according to the deflection amount; that is, unwanted amounts of the position and attitude are corrected. Accordingly, the correction method ensures highly accurate position and attitude of the distal end.

As described above, since there is no need of additionally providing a component, such as a force sensor, to the robot, or enhancing rigidity of the arm, deflection caused by an external force can be corrected without curbing size or weight reduction or speed increase of the robot 1.

Furthermore, the correction method enables positioning of the distal end of the tool with high accuracy, and detection of the force applied to the distal end of the tool with high accuracy. Thus, the robot is able to conduct work of great difficulty that needs high assembling accuracy.

In this case, the load torque applied to the second axis is calculated from the difference between the angles detected on the input and output-shaft sides of the second axis, and the rigidity of the decelerator 24 provided to the second axis. Thus, the load torque applied to the second axis in the rotation direction can be calculated without the need of providing any additional component to the robot.

Then, the angle detected on the output-shaft side of the first axis is corrected using the deflection amount, thereby reducing the error between the actual rotation angle and the detected angle and thus properly controlling the rotation angle.

Use of the deflection amount for correction of the estimated load torque of the first axis enables highly accurate estimation of the load torque. This way of correction can prevent the workpiece (W) from being damaged due to the robot applying an excessive force thereto or from being erroneously assembled due to the robot being unable to generate a necessary force.

Furthermore, use of the deflection amount for correction of the distal end position of the tool 9 enables highly accurate positioning of the distal end position of the tool 9. This way of correction can prevent assemblage at an erroneous position or prevent possible scratches on the surface of the workpiece (W) or possible damage to the workpiece (W).

The controller 10 may also be used for correcting deflection caused by an external force, without curbing size or weight reduction or speed increase of the robot 1, the controller 10 being provided with a moment acquisition section obtaining a moment applied to the first axis in the non-rotation direction, a deflection amount acquisition section obtaining a deflection amount of the first axis, and a correction section correcting the control value based on the deflection amount. This is because use of the controller 10 for the correction can eliminate the need of additionally providing a component, such as a force sensor, to the robot, or enhancing rigidity of the arm.

<Other Embodiments>

The disclosure described above should not be construed as being limited to the embodiment described above or illustrated in the drawings but may be implemented through modifications or extensions of the embodiment or combinations of these embodiments, without departing from the spirit of the disclosure.

In the above embodiment, the distal end position of the tool 9 is directly corrected using a deflection amount (deflection correction). However, conditions for making no correction of the arm motion may be established despite the detection of the robot as being deflected. Specifically, the correction section may be so configured as not to make a position correction during impedance control.

For example, in FIG. 7, even when the workpiece (W) is pressed, with the robot being properly positioned and deflection being caused by the reaction force against the pressing force, the distal end position of the tool 9 may be taken to be properly positioned.

In this regard, if the robot is deflected leftward as viewed in FIG. 7, automatically followed by rightward movement of the distal end of the tool 9 according to the deflection amount, that is, automatically followed by correction of the distal end position of the tool, the distal end of the tool 9 may be shifted from the proper position. Also, since the tool 9 is being pressed against the workpiece (W), the surface of the workpiece (W) may be scratched by the tool 9.

Therefore, it may be so configured that no position correction is made during impedance control, for example, even when deflection has been detected, in particular, that no position correction is made during impedance control in a direction perpendicular to the direction in which the force is applied. In this case, whether impedance control is being performed can be determined by providing a passive external force detector or an active external force detector. The passive external force detector may detect an external force in a state where, for example, the robot is applying a pressing force through a spring member or the like. The active external force detector may detect an external force based on a difference, for example, between the control value given to the robot 1 and the actual amount of motion. Alternatively, whether the robot 1 has arrived at the workpiece (W) can be determined from the control value.

Figure 9:
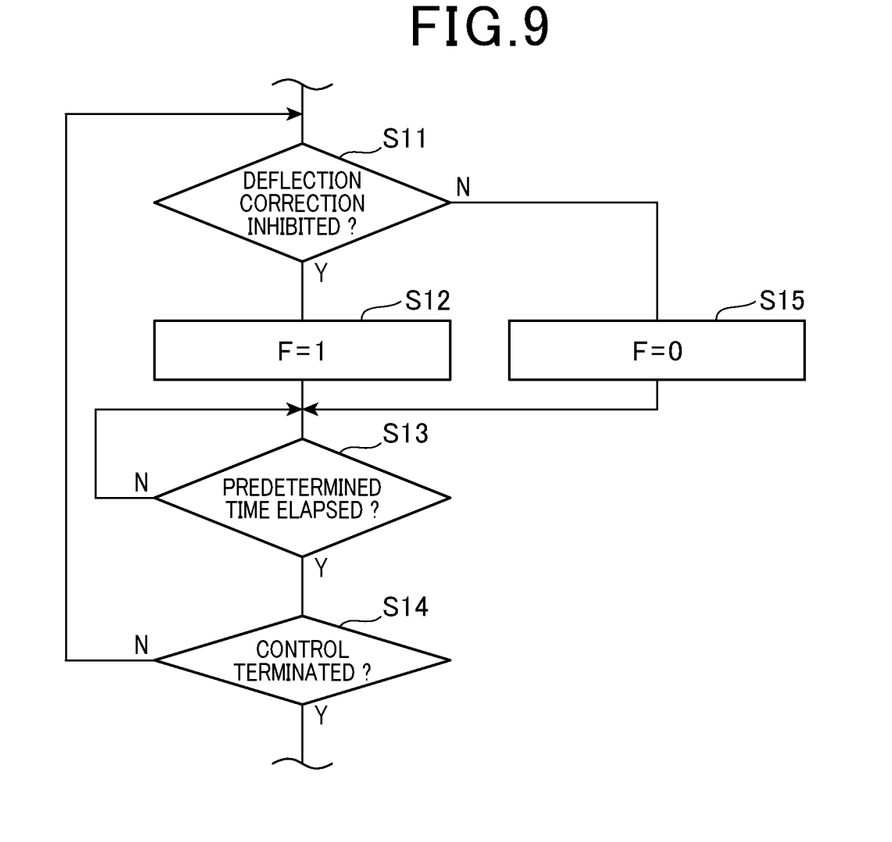
FIG. 9 is a flow diagram illustrating a modification.

Specifically, the control unit 11 may be permitted to execute the process shown in FIG. 9. More specifically, while executing the control program stored in advance in the ROM 11C, the CPU 11B of the control unit 11 may determine whether the current state is unfavorable for performing deflection correction, such as impedance control (whether the current state is deflection correction inhibited state) (step S11).

If the determination is YES, the CPU 11B sets up a flag F indicating deflection correction inhibition to give instructions for deflection correction inhibition (step S12: F=1). The initial value of the flag F is 0. Then, the CPU 11B waits a predetermined time interval (step S13) and reiterates the aforementioned processing unless control is terminated (NO at step S14). If the determination at step S11 is NO, the CPU 11B sets the flag F to 0 to inform the control program of the release of correction inhibition. Thus, while executing the control program, the CPU 11B monitors the state of the flag F periodically, for example, for execution or inhibition of deflection correction.

The conditions for deflection correction inhibition are not necessarily limited to the period of executing impedance control but may be other conditions under which the distal end position of the tool 9 may better not be forcibly corrected.

The above embodiment has been described by way of an example of a vertical articulated robot. However, the correction method of the embodiment may be applied to a horizontal articulated robot.

In the above embodiment, the rotary shaft (J1) of the base 2 serves as the first axis, and the rotary shaft (J2) of the shoulder 3 serves as the second axis. However, the first and second axes provided with a plurality of arms are not limited to the use of combining the rotary shafts 31 and 32 of the base 2 and shoulder 3, respectively. As long as a perpendicular relationship is established between axes, another rotary shaft of the robot 1 may serve as the first axis and a shaft perpendicular to the rotary shaft may serve as the second axis, and deflection of the rotary shaft may be calculated or corrected.

REFERENCE SIGN LIST

In the drawings:
1 robot
2 base (the first arm)
3 shoulder (the second arm)
9 tool (holding tool)
10 controller (control apparatus)
11 control unit (moment acquisition section, deflection amount acquisition section, correction section)
20 first motor (motor)
J1 a first axis (the first axis)
J2 a second axis (the second axis)

What is claimed is:

1. A method for correcting deflection of a robot having at least a first arm and a second arm, by correcting a control value for controlling an arm distal end in terms of position and attitude affected by deflection of the first arm, the first arm having a first axis as a rotary shaft and being made rotatable about the first axis, the second arm having a second axis as a rotary shaft rotating relative to the first arm and perpendicular to the first axis, the second arm being made rotatable about the second axis and being positioned further to the arm distal end than the first arm is, wherein the method comprises:

calculating a moment applied to the first axis in a non-rotation direction that is opposite to a rotation direction of the first axis, based on a load torque applied to the second axis in a rotation direction, a moment due to a second-axis-side self-weight, and a ratio of a distance between rotation centers of the first axis and the second axis, to a distance between rotation centers of the second axis and a tool;

calculating a deflection amount indicated by an angle of the first axis tilting in the non-rotation direction, based on the moment applied to the first axis in the non-rotation direction, and a rigidity of the first axis in the non-rotation direction; and correcting the control value for use in controlling the robot, based on the deflection amount.

2. The method for correcting deflection of a robot according to claim 1, wherein the load torque applied to the second axis in the rotation direction is calculated from a difference between angles detected on an input-shaft side and an output-shaft side of the second axis, and a rigidity of a decelerator provided to the second axis.

3. The method for correcting deflection of a robot according to claim 2, wherein an angle detected on an output-shaft side of the first axis is corrected based on the deflection amount.

4. The method for correcting deflection of a robot according to claim 2, wherein an estimated load torque applied to the first axis is corrected based on the deflection amount.

5. The method for correcting deflection of a robot according to claim 2, wherein a distal end position of a tool is corrected based on the deflection amount.

6. The method for correcting deflection of a robot according to claim 1, wherein an angle detected on an output-shaft side of the first axis is corrected based on the deflection amount.

7. The method for correcting deflection of a robot according to claim 6, wherein an estimated load torque applied to the first axis is corrected based on the deflection amount.

8. The method for correcting deflection of a robot according to claim 6, wherein a distal end position of a tool is corrected based on the deflection amount.

9. The method for correcting deflection of a robot according to claim 1, wherein an estimated load torque applied to the first axis is corrected based on the deflection amount.

10. The method for correcting deflection of a robot according to claim 9, wherein a distal end position of a tool is corrected based on the deflection amount.

11. The method for correcting deflection of a robot according to claim 1, wherein a distal end position of a tool is corrected based on the deflection amount.

12. An apparatus for correcting motion of a robot having at least a first arm and a second arm, by correcting a control value for controlling an arm distal end in terms of position and attitude affected by deflection of the first arm, the first arm having a first axis as a rotary shaft and being made rotatable about the first axis, the second arm having a second axis as a rotary shaft rotating relative to the first arm and perpendicular to the first axis, the second arm being made rotatable about the second axis and being positioned further to the arm distal end than the first arm is, wherein the apparatus comprises:

a moment acquisition section acquiring a moment applied to the first axis in a non-rotation direction that is opposite to a rotation direction of the first axis, based on a load torque applied to the second axis in a rotation direction, a moment due to a second-axis-side self-weight, and a ratio of a distance between rotation centers of the first axis and the second axis, to a distance between rotation centers of the second axis and a tool;

a deflection amount acquisition section acquiring a deflection amount indicated by an angle of the first axis tilting in the non-rotation direction, based on the moment applied to the first axis in the non-rotation direction, and a rigidity of the first axis in the non-rotation direction; and a correction section correcting the control value for use in controlling the robot, based on the deflection amount.

* * * * *